Feb. 24. 1925.
Re. 16,005
A. R. BECK
OIL CAN
Original Filed Feb. 8, 1922
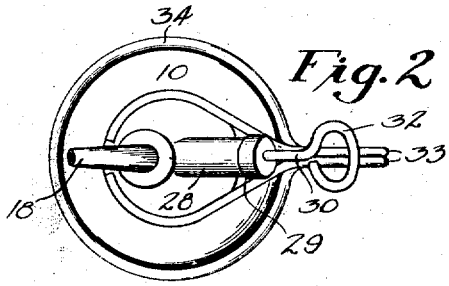
Fig. 2
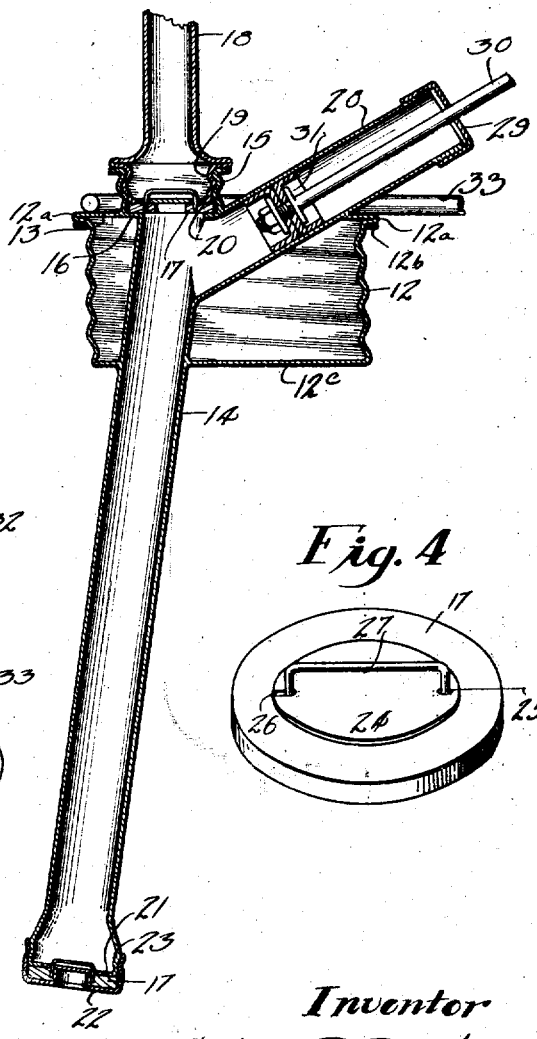
Fig. 3
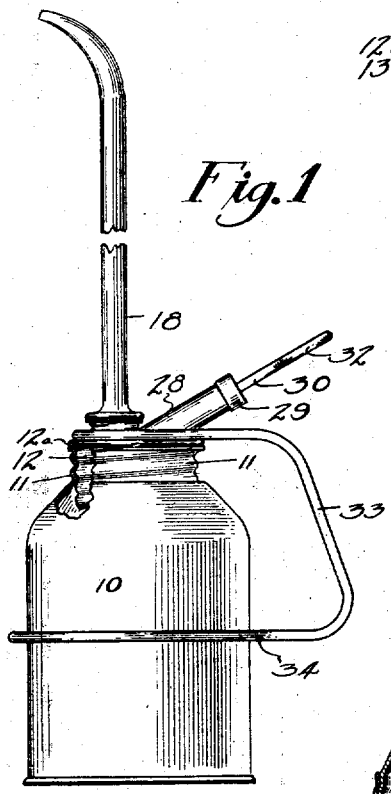
Fig. 1
Fig. 4
Inventor
Arthur R. Beck
By Dair Truman & Letts Attys.

Reissued Feb. 24, 1925. Re. 16,005

UNITED STATES PATENT OFFICE.

ARTHUR R. BECK, OF SIOUX CITY, IOWA, ASSIGNOR OF ONE-HALF TO RILEY J. BECK, OF SIOUX CITY, IOWA.

OIL CAN.

Original No. 1,464,556, dated August 14, 1923, Serial No. 534,940, filed February 8, 1922. Application for reissue filed October 28, 1924. Serial No. 746,442.

*To all whom it may concern:*

Be it known that I, ARTHUR R. BECK, a citizen of the United States, and a resident of Sioux City, in the county of Woodbury and State of Iowa, have invented certain new and useful Improvements in Oil Cans, of which the following is a specification.

My invention relates to that class of oil cans in which the oil is projected from a spout under positive pressure from a force pump.

An object of my invention is to provide an oil can of this class of simple, durable and inexpensive construction.

More specifically it is my object to provide an oil can of this class in which an induction tube, supported on a removable cap, extends into the oil can body, has at its lower end an inwardly-opening check-valve, and at its upper end an outwardly-opening check-valve, a spout attached to its upper end, and a pump mechanism communicating with it.

A further object is to provide an improved valve mechanism of simple, durable and inexpensive construction, so arranged that the two valves are readily and easily accessible and removable, the valves being identical in structure.

More specifically, referring to the last object, it is my object to provide an oil can as mentioned in which the upper valve is secured in place by the spout, which is removable, and in which the lower valve is secured in place by an apertured cap, the valves being engaged between the respective spout and cap and the induction tube.

A further object is to provide an oil can as described including the can body, the removable cap, the induction tube, valves, spout and pumping mechanism, and also a handle permanently fixed to the cap in fixed relation to the pumping mechanism, and having a portion freely encircling the can body, for bracing the lower end of the handle, whereby the handle and pump may maintain their proper relation to each other during the removal and replacing of the can body in engagement with the cap.

With these and other objects in view, my invention consists in the construction, arrangement and combination of the various parts of my device, whereby the objects contemplated are attained, as hereinafter more fully set forth, pointed out in my claims, and illustrated in the accompanying drawings, in which:

Fig. 1 shows a side elevation of an oil can embodying my invention, portions being broken away to better illustrate the construction.

Fig. 2 shows a top or plan view of the same.

Fig. 3 shows an enlarged detail sectional view through the pump and feed pipe and screw cap for the can, and part of the handle and discharge spout.

Fig. 4 shows an enlarged detail perspective view of one of the valves.

Referring to the accompanying drawings, I have used the reference numeral 10 to indicate generally an oil can body which is preferably of standard construction. The can body, 10, has a neck, 11, which is preferably threaded to receive the cap, 12. It will be understood, however, that other means of connecting the cap and can body might be employed, as for instance, inclined lugs formed on the cap, 12, or neck, 11, and co-operating with registering inclined grooves in the co-acting element.

A gasket, $12^b$, adhering to the extending under edge of the top, 13, is used to seal the juncture between the cap, 12, and neck, 11.

The cap, 12, has the upper wall, 13. An induction tube, 14, is provided which extends through the cap, 12, and is soldered or otherwise suitably secured to the bottom wall, $12^c$, thereof. The upper end of the induction tube, 14, is extended through the wall, 13, and thence enlarged to form a valve chamber, 15. The chamber, 15, thus is provided at its lower extremity with a shoulder, 16, formed by the enlargement of the tube, 14.

The spout, 18, has a threaded base portion, 19, adapted to be received in the chamber, 15, and having at its lower edge an inturned flange, 20, which engages the valve body, 17, and secures it against the shoulder, 16 of the valve chamber, 15, when the spout is threaded into place. The lower end of the induction tube, 14, is provided with the inturned flange or shoulder, 21, against which the valve body, 17, of the lower valve is secured by means of the apertured cap, 22, threaded onto the enlarged end, 23, of the induction tube, 14.

Each valve comprises a valve body, 17, a valve proper, 24, having an opening, 25, at one side, a slot, 26, in the other side, and a U-shaped rod, 27, secured at its ends into the valve body, 17, and having its arms extended through the opening, 25, and the slot, 26.

It will be seen that a simple construction is thus provided by which the valves may be readily removed for replacement or repair, and in which the valves are identical in construction. Cheapness and simplicity, as well as the advantage of accessibility, are thus obtained.

A pump cylinder, 28, communicates with and is secured to the upper end of the induction tube, 14, and is closed at its outer end with an apertured cap, 29. A piston rod, 30, extends through the aperture of the cap, 29, being slidably mounted therein, and receives at its end the double-acting piston, 31. The outer end of the piston rod, 30, is preferably provided with a thumb-engaging loop, 32.

It will be understood that as the piston, 31, is moved outwardly the check-valve in the upper end of the induction tube will remain closed and oil will be drawn through the lower valve. As the piston is moved inwardly the lower valve will close and the upper valve will be forced open to allow the oil to be forced up through the spout.

A very important feature of my invention resides in the handle construction, which I will now describe.

In any oil can in which a pump is employed, it is desirable that the handle by which the oil can is carried be situated in a position from which the plunger or actuated member of the pump may be conveniently reached by the thumb of the hand which grasps the handle, in order that the oil can may be manipulated entirely by one hand. This has been arrived at in some devices by providing co-acting devices on the can body and cap which serve to bring the can body and cap into predetermined relative positions when they are engaged with each other. By such means the handle may be attached to the can body in the proper position and relied upon to always maintain its correct position relative to the pumping mechanism. However, such devices have not proven entirely practical, being often too complicated and also interfering with the registering of the cap and can body in such tight fit as to form an oil-tight joint.

The term "pump" is used in the claims to include the pump cylinder, piston and actuating piston rod.

In other constructions, the neck of the oil can is rotatably attached to the can body, so that the cap may be threaded down to close engagement with the neck, and the neck and cap both then rotated to position to properly align the pump and handle. It will be seen that in each of these constructions a more complicated structure is involved than is present in applicant's invention, and the standard can body is not utilized.

It is much preferable to employ a standard can body construction, such as illustrated herein, having a screw threaded neck into which the cap may be screwed, and between the upper edge of which and the flange, 12[a], of the cap a tight joint may be secured by screwing the cap down securely. It will be seen that in so rotating the cap in attaching it to the can body, it will be difficult to bring it to the same position relative to the can body each time that it is threaded into place, and still have it screwed tight against the neck. The ordinary wear in the gasket, which is ordinarily used between the cap and can neck to make an oil-tight joint, as well as the resiliency of the metal wall in which the threads are formed, will allow variations in the amount of such relative rotation of the cap and can body.

I therefore provide a handle formed of a single piece of wire rod, bent at its central portion to form a ring, 34, which normally encircles the can body, 10, the two ends of the rod being thence extended away from the ring, 34, in the plane thereof, thence bent upwardly to form the handle proper, 33, thence bent back in a plane substantially parallel to that of the ring, 34, spread apart to encircle the cylinder, 28, and valve chamber, 15, and soldered or otherwise suitably secured to the upper wall, 13, of the cap, 12.

It will be seen that the handle is thus secured and permanently fixed to the cap, 12, and freely encircles the can body when the same is in place. The ring 34, serves to brace the lower end of the handle against the can body, and also to help guide the can body into position to register with the cap when being inserted thereon. The can body may then be rotated until a tight engagement is secured with the cap and the handle will remain continuously in the correct position relative to the piston rod, 30.

The advantages of my improved construction are several. The valves are interchangeable and may be replaced with little trouble. The spout is quickly replaceable, and also serves to hold the upper valve in position. The ordinary can body may be used, thus increasing the utility of the rest of the device, which may be used with the bodies of other oil cans. It is thus possible to replace the can body from many sources should it become impaired. When the can is screwed into place on the cap, the handle, 33, may be used as a lever in obtaining a close engagement. The handle construction is very cheap, and the arrangement of the handle and the thumb-engaging loop, 32, make it very convenient for the operator to use the oil can. The use of the thumb-engaging loop, 32, eliminates springs commonly used in oil can pumps, and eliminates the objection of the rod, 30, continuously remaining in extended position when not in use.

Some changes may be made in the construction and arrangement of the parts of my invention without departing from the real spirit and purpose of my invention, and it is my intention to cover by my claims any modified forms of structure or use of mechanical equivalents which may be reasonably included within their scope.

I claim as my invention:

1. In a device of the class described, the combination of a can body having a screw threaded neck with a screw threaded cap attachable to said screw threaded neck; a discharge mechanism supported on the cap, including a spout, an induction tube, and a pump communicating with the induction tube, and a handle secured to the cap adjacent the pump having a portion freely encircling the can body, said pump having an operating member adjacent the handle.

2. In a device of the class described, the combination of a can body having a screw threaded neck with a screw threaded cap attachable to said threaded neck, a discharge mechanism supported on the cap, including a pump; and a handle secured to the cap adjacent the pump, having a portion freely encircling the can body, said pump having an operating member adjacent the handle.

3. In a device of the class described, the combination of a can body having a neck, with a cap attachable to said neck by rotating movement, a discharge mechanism supported on the cap comprising a spout, an induction tube, and a pump communicating with the induction tube, and a handle secured to the cap adjacent the pump, having a portion freely encircling the can body, said pump having an operating member adjacent the handle.

4. In a device of the class described, the combination of a can body having a neck with a cap which may be attached to said neck by rotating movement, a discharge mechanism supported on the cap, including a pump; and a handle secured to the cap adjacent the pump, having a portion freely encircling the can body, said pump having an operating member adjacent the handle.

5. In a device of the class described, a can body, a cap attachable to said can body, a discharge mechanism supported on the cap including a pump; and a handle secured to the cap adjacent the pump, having a portion freely encircling the can body, said pump having an operating member adjacent the handle.

6. In a device of the class described, a can, a removable cap therefor, an induction tube fixed in the cap and having shouldered portions near its ends, a spout removably attached to one end of the induction tube, an apertured cap removably attached to the other end of the induction tube, and identical check-valve structures for each end of the induction tube, including valve seats engageable between the spout and apertured cap and the respective shouldered portions of the induction tube.

7. In a device of the class described, a can, a removable cap therefor, an induction tube fixed in the cap, a spout removably attached to one end of the induction tube, an apertured cap removably attached to the other end of the induction tube, and identical check-valve structures for each end of the induction tube including valve seats engageable between the spout and apertured cap and the respective ends of the induction tube.

8. In a device of the class described, a can, a removable cap therefor, an induction tube fixed to the cap and extending therethrough to receive a spout at its outer end, a spout removably attached to the outer end of said tube, an apertured cap removably attached to the inner end of the induction tube, and identical check valve structures for each end of the tube, including valve seats engageable between the spout and apertured cap and the respective ends of the induction tube.

9. In a device of the class described, a can body having a threaded neck, a cap having a screw threaded portion adapted to be screwed into said neck to attach the cap to the can body, a discharge mechanism supported on the cap including a pump and a handle permanently secured to the cap adjacent the pump and freely movable relative to the can body, said pump having an operating member adjacent the handle.

10. In a device of the class described, a can body, a cap attachable to said can body, a discharge mechanism supported on the cap including a pump, and a handle secured to the cap having a portion freely encircling the can body, said pump having an operating member adjacent the handle.

11. In a device of the class described, a can body, a cap attachable to the can body, a discharge mechanism supported on the cap including a pump and a handle comprising a rod having its central portion bent into a ring adapted to freely encircle the can body, the two ends of the rod being thence bent away from the plane of the ring to positions approaching right angles thereto, and being thence bent over the ring in a plane substantially parallel thereto, and thence secured to the cap.

12. An improved oil can comprising an oil can body having a screw threaded neck at its top, a screw threaded cap attachable to the can body by threading into the neck, an induction tube permanently fixed to the screw threaded cap and having a valve at its lower end, its upper end above the screw threaded cap being formed with a valve seat and with a screw threaded extension above the valve seat, a valve mounted in said valve seat, a discharge spout attached to said screw threaded extension and having a portion engaging the valve body, a pump cylinder permanently fixed to the screw threaded cap and communicating with the induction tube, a piston therein, a piston rod connected with the piston and provided with a loop, and a handle for the oil can loosely encircling the body portion of the oil can and permanently fixed to the screw threaded cap.

Signed at Sioux City, in the county of Woodbury and State of Iowa, this 21st day of October, 1924.

ARTHUR R. BECK.